US005121248A

United States Patent [19]

Mohon et al.

[11] Patent Number: 5,121,248

[45] Date of Patent: Jun. 9, 1992

[54] ACOUSTO-OPTIC TIME-INTEGRATING SIGNAL PROCESSOR

[75] Inventors: W. Neil Mohon; Robert J. Berinato; Anthony F. Zwilling, all of Huntsville, Ala.; Christopher S. Anderson, Cary, N.C.

[73] Assignee: Dynetics, Inc., Huntsville, Ala.

[21] Appl. No.: 376,352

[22] Filed: Jul. 6, 1989

[51] Int. Cl.[5] .......... G02F 1/11; G02F 1/33; G06E 3/00

[52] U.S. Cl. .......... 359/306; 359/285; 364/822

[58] Field of Search .......... 350/358; 364/819, 822; 359/306, 285

[56] References Cited

U.S. PATENT DOCUMENTS 4,426,134 1/1984 Abramovitz et al. .......... 350/358

4,558,925 12/1985 Casseday et al. .......... 364/822

4,644,267 2/1987 Tsui et al. .......... 350/358

*Primary Examiner*—Eugene R. LaRoche

*Assistant Examiner*—Michael Shingleton

*Attorney, Agent, or Firm*—Phillips & Beumer

[57] ABSTRACT

An acousto-optic correlator for wideband signals. The invention is defined by and relates to device in which a laser beam is split into two paths of a Mach-Zehnder interferometer arrangement. A first Bragg cell of which, modulated with a signal $Re\{S_1(t)\exp(jw_0t)\}$, receives the first beam that is reflected off a first flat mirror. A second Bragg cell of which, modulated with a signal $Re\{S_2(t)\exp(jw_0t)\}$, receives a beam that is reflected off a second flat mirror. The undiffracted light from both of the modulators is blocked. The diffracted light emitted from the first and second Bragg cells passes through first and second imaging lenses respectively. The two diffracted light beams are then combined with an angular separation between beams. The combined beam is incident upon a square-law detector array which is at the image plane of the imaging lenses. Due to the square-law detection process, terms of low frequency biases and complex correlation on a spatial carrier develop. This output is filtered to remove the low frequency component. The remaining signal being demodulated by in-phase and quadrature detection techniques. The correlation magnitude and the phase are calculated. This provides for precise temporal resolution.

16 Claims, 5 Drawing Sheets

ACOUSTO-OPTIC TIME-INTEGRATING SIGNAL PROCESSOR

RIGHTS OF THE GOVERNMENT

The U.S. Government has rights in the described and claimed invention as represented by a Department of the Army Agreement.

BACKGROUND OF THE INVENTION

1. Field of the Invention

Our invention relates generally to the field of advanced signal processing employing correlation of electrical signals, and specifically to an acousto-optic system for the real-time correlation of very wideband signals.

2. Background of the Invention

The correlation of electrical signals has a fundamental role to play in many signal processing applications. Correlation generally has its roots in the employment of an electrical filter which, when matched to the particular electrical signal to be processed, provides a maximum signal to noise gain. In some instances two signals to be analyzed are cross-correlated, where the processing can be viewed as determining the degree of similarity between the two signals. Electrical correlation can be effected by means of delay lines, such as surface acoustic wave compressors, or by digital means. Delay lines typically limit the achievable processing time-bandwidth product to on the order of 1000. Digital techniques are typically bandwidth-limited due to the need to sample and digitize the waveform to be analyzed at a data rate equal to or greater than twice the highest frequency in the signal. For many applications, both large time-bandwidth product and very wide bandwidths are required. A standard technique, known as stretch processing, exists for obtaining the correlation of large time-bandwidth product, very wideband linear frequency modulated signals, but is not applicable to other than linear frequency modulated signals.

An alternate approach, and one particularly suited to the correlation of high time-bandwidth product, very wideband signals, is available through the employment of acousto-optic delay line devices. Acousto-optic correlator architectures have been disclosed in U.S. Pat. Nos. 3,634,749; 4,225,938; 4,326,778; 4,421,388;and 4,558,925. As a preface to the discussion of these references with respect to the present invention, the invention may be summarized as follows.

This invention discloses an acousto-optic architecture for obtaining the complex correlation between two signals. The processor has been specifically configured to accommodate very wideband signals typical of advanced radar and communication intercept processing as well as commercial applications such as seismic processing, computerized tomography, ultrasonic imaging, and nuclear magnetic resonance. This correlator is general purpose in the sense that completely arbitrary waveform modulations can be accommodated, and the desired correlation magnitude and phase can be obtained. An interferometric time-integrating correlation algorithm is employed to achieve the complex correlation output on a linear optical detector array. As one feature, complex correlation is achieved by modulating the correlation onto a spatial carrier whose frequency can be conveniently selected. Subsequent to detection, an electronic bandpass filter is employed to remove the inherent undesirable low-frequency bias terms, and coherent in-phase and quadrature detection is performed and the calculation of the correlation magnitude and phase is achieved.

Now turning to the prior art, an early description of a time-integrating acousto-optic correlator is disclosed in U.S. Pat. No. 3,634,749, entitled "Acousto-Optical Signal Processing System". In this patent, two counter-propagating acoustic waves diffract an incoming optical beam, which is then imaged onto a linear detector array. Spatial filtering to remove the undiffracted light is performed within an imaging lens system. The correlation that results after time integration is intentionally modulated by a spatial carrier which allows the correlation to be separated from undesirable low-frequency bias terms by means of an electronic bandpass filter. A significant difference from the instant invention is that the spatial carrier frequency is set by the center frequency of the Bragg cell and thus cannot be modified. The resultant correlation is then removed from the carrier by conventional electronic demodulation techniques.

An enhanced version of this early invention appears in U.S. Pat. No. 4,326,778, entitled "Acousto-Optic Time Integrating Correlator". The application of this processor was to the correlation of radio-frequency signals to perform time-difference-of-arrival intercept of spread-spectrum emitters. In this application, the correlation is once again modulated onto a spatial carrier at the output of the linear optical detector array. In this case the spatial carrier frequency is a function of the difference between the Bragg cell center frequency and the center frequency of the intercepted signal, and is thus not known a priori as it is in our application. The undesirable bias terms can be removed in this case by performing an additional correlation, where one of the signals is phase shifted 180°, and subtracting this result from the first correlation, which is a significantly different approach than that of the instant invention.

Another correlator is disclosed in U.S. Pat. No. 4,421,388, entitled "Acousto-Optic Time Integrating Frequency Scanning Correlator", and is an acousto-optic two-dimensional frequency scanning correlator for cross correlating signals which are separated in frequency. Two coherent light beams, which are derived from the same laser, are projected into respective Bragg cells which contain the signals to be cross-correlated. The respective output beams are compressed in the x-direction and expanded in the y-direction and are made incident on an acousto-optical correlator device having chirp signals counterpropagating thereacross. The optical output is imaged onto a time-integrating photodiode array which provides the desired cross-correlation as a function of the frequency offset. This correlator is especially useful in radar applications where the target return may be significantly Doppler shifted from the reference signal input into the correlator.

Of the references, U.S. Pat. No. 4,558,925, entitled "Multi-Function Acousto-Optic Signal Processor", appears to be the most similar in optical configuration to the correlator of the present invention in that it employs separate Bragg cells in two separate legs of a Mach-Zehnder interferometer. Each of the Bragg cells are illuminated with coherent light derived from the same laser. The diffracted and undiffracted beams from each of the Bragg cells are then combined in a beamsplitter and subsequently Schlieren-imaged back onto a linear optical detector array. The square-law detection process then yields the correlation result on a spatial carrier in addition to the inherent undesirable low-frequency bias terms. Due to the nature of the imaging system employed, wherein a single Schlieren imaging system is employed after combining the two beams, the bandwidth capability of the system is limited due to the physical limitations on lens f-numbers. However, a major difference from the instant invention is that the spatial carrier fringe frequency is a function of the difference between the Bragg cell center frequency and the center frequency of the intercepted signal, and is thus not known a priori. Because of this, a bandpass filter, such as suggested by U.S. Pat. 3,634,749, cannot be employed to remove the undesirable low-frequency bias terms. Finally, the system of this patent is configured for a signal intercept application, and no means are provided for the measurement of the correlation phase as is provided in the instant invention.

SUMMARY OF THE INVENTION

In accordance with the instant invention, an acousto-optic time-integrating signal processor is constructed capable of performing the coherent correlation of very wideband signals with entirely arbitrary modulation formats. In it, a coherent radiation source, such as a laser, emits a beam of coherent radiation which is split into first and second beams. The first beam is directed to a first modulator at the appropriate angle for efficient modulation. Likewise, the second beam is directed to a second modulator at the appropriate angle for efficient modulation. The first modulator is driven by a signal $Re\{S_1(t)exp(jw_ot)\}$, which serves to modulate the incident first beam. $Re\{\cdot\}$ denotes the real part of the complex signal within the brackets, exp denotes the exponential function, and j is equal to the square root of $-1$. The second modulator is driven by a signal $RE\{S_2(t)exp(jw_ot)\}$ which serves to modulate the incident second beam. Signals $S_1(t)$ and $S_2(t)$ to be correlated are in general complex and are comprised of a magnitude and a phase. Acousto-optic modulators output diffracted and undiffracted beams, and in accordance with one of the features of this invention, means are provided to absorb or block the undiffracted beam shortly after exiting the modulator. Thus the undiffracted portion of beams one and two are absorbed or blocked by a first and second optical spatial filter or other light blocking means prior to imaging and/or photodetection. The significance of this is that because only the diffracted beam is information carrying, and, by the early elimination of the undiffracted beam, the imaging lens systems which follow do not have to contend with the undiffracted beam and can then accommodate a greater bandwidth of signal information.

The two diffracted, modulated beams are directed, by imaging lens systems, onto the plane of detection. As a further feature of this invention, means are provided to modulate the complex correlation onto a spatial carrier signal as by effecting an angular offset between the modulated and imaged beams whereby they arrive at the plane of detection at a selected angle with equal path lengths. Discrete elements of the imaged beams combined in the plane of detection are detected and each separately squared and integrated, thus forming an electrical representation of the traveling wave information in the modulators. Where required first and second imaging devices are positioned so as to produce a desired magnification of the modulation to achieve desired sampling requirements.

Also in accordance with a further feature of this invention, a correlation delay calibration system is constructed for achieving accurate calibration of the acousto-optic signal processor result. This correlation delay calibration system first generates an electrical carrier signal and a sinusoidal modulation signal. These two signals are then combined in a mixer to create a two-tone calibration waveform. This two-tone calibration waveform is then power split into two identical waveforms which are transmitted to the input of the acousto-optic signal processor. The output correlation for this input calibration waveform is known a priori and can therefore be employed to calibrate the acousto-optic signal processor result.

OBJECTS OF THE INVENTION

It is an object of this invention to obtain coherent correlation of very wideband signals with arbitrary modulation formats.

It is also an object of this invention to output multiple time resolution cells at a much lower bandwidth (on the order of three orders of magnitude) than the input signal for ease of digital conversion and subsequent processing.

It is another object of this invention to provide a processor which comprises a coherent interferometric acousto-optic time-integrating correlator, allowing attainment of the maximum possible bandwidth and time-bandwidth product.

It is a further object of this invention to provide a processor which is designed to use commercially available Bragg cells and optical detector arrays, and which is realizable in compact form.

Another object of this invention is to provide a processor which realizes the extraction of both the correlation magnitude and correlation phase, thereby maintaining the coherency of the correlation.

It is a further object of this invention to provide a correlation delay calibration system to allow accurate scaling of the processor output coordinates.

Lastly, it is an object of this invention to provide an arrangement which is especially well configured for very wideband radar pulse compression of all high time-bandwidth product radar waveforms.

BRIEF DESCRIPTION OF THE DRAWINGS

Our invention may be best understood when the specification which follows is read in conjunction with the drawings, in which.

DESCRIPTION OF THE PREFERRED EMBODIMENT

Figure 1:
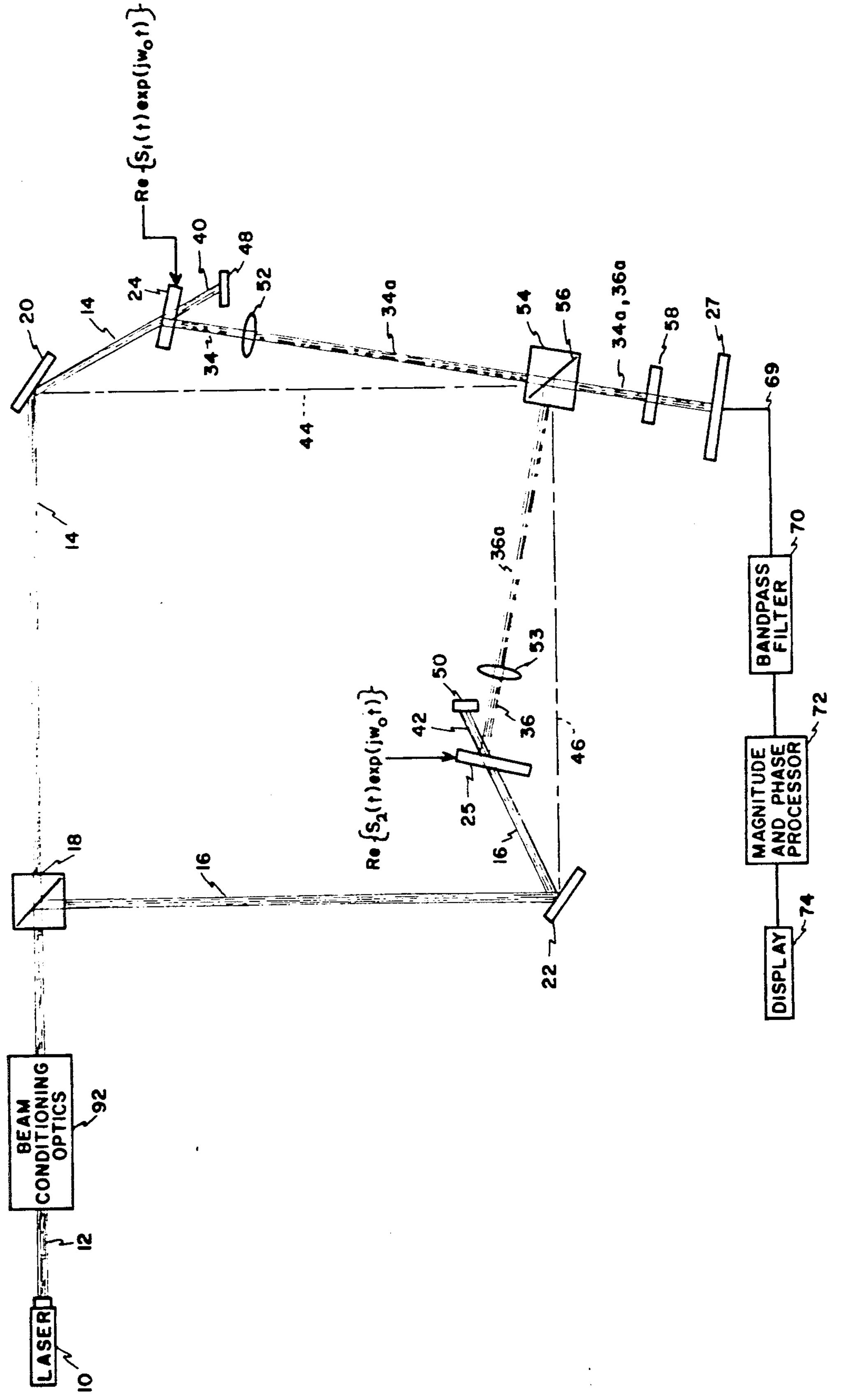
FIG. 1 is a diagrammatic illustration of a coherent interferometric acousto-optic time-integrating correlator embodying the principles of our invention.

Referring to the drawings, FIG. 1 illustrates a coherent interferometric acousto-optic time-integrating correlator used to perform the cross-correlation of very wideband signals having arbitrary modulation formats.

Examining FIG. 1, laser 10 generates a beam 12 of collimated, coherent, linearly polarized light, for example, of a wavelength of 632.8 nm. The polarization of laser beam 12 is oriented so as to achieve maximum Bragg cell diffraction efficiency. After passing through beam conditioning optics 92 which is conventional to reduce or eliminate certain optical distortions, laser beam 12 illuminates an optical arrangement following a Mach-Zehnder interferometer geometry wherein beam 12 is split into beams 14 and 16 by beam splitter 18, beam 14 being directed onto mirror 20 and beam 16 being directed onto mirror 22. Thereafter, beam 14 is reflected onto Bragg cell 24 and beam 16 onto Bragg cell 25.

Figure 2:
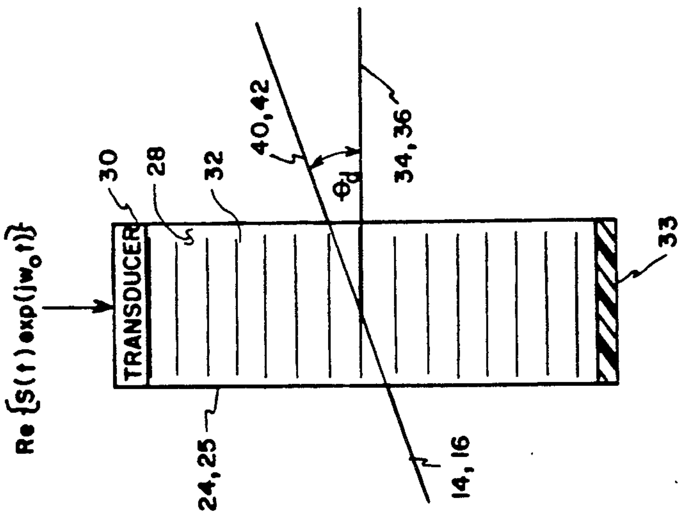
FIG. 2 illustrates a simplified diagram of a Bragg cell as employed by the system illustrated in FIG. 1.
Figure 2A:
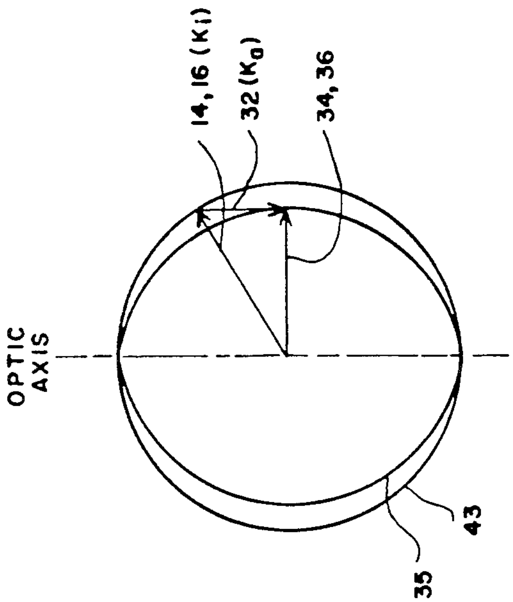
**FIG. 2*a*** is a diagram illustrative of the acousto-optic interactions within the Bragg cells.

The critical elements of the coherent interferometric acousto-optic time-integrating correlator shown in FIG. 1 are the acousto-optic Bragg cells 25 and 26, which are illustrated in greater detail in FIGS. 2 and 2*a*. Bandwidths of commercially available Bragg cells are usually an octave and range from about 10 megahertz to several gigahertz. As shown, this device comprises an ultrasonic medium 28, an electro-acoustic transducer 30 at one end, and an acoustic absorber 33 at the other end. A voltage signal $Re\{S_1(t)exp(jw_0t)\}$ (FIG. 1) is supplied to Bragg cell 24, and a signal $Re\{S_2(t)exp(jw_0t)\}$ (FIG. 1) is supplied to Bragg cell 25, $w_0$ being the Bragg cell center frequency. The effect of an impressed signal is to produce an acoustical sound wave modulation of the ultrasonic medium 28. The sound wave propagates through transparent medium 28, where the stress due to sound modulates the refractive index of the medium. This modulated refractive index $n(t-x'/v_a)$, where x' is the spatial coordinate in the Bragg cell and $v_a$ is the velocity of acoustic propagation in medium 28, forms a propagating phase grating 32 which diffracts light that is incident on the sound-stressed medium. Incident light 14, 16 is directed through medium 28, in one instance emerging as diffracted beam 34, 36 and in another instance as undiffracted beam 40, 42.

To achieve efficient very wideband Bragg cell operation the birefringent phase matching interaction technique may be employed. Using this technique, a birefringent material such as lithium niobate is used as an ultrasonic medium. For certain crystal orientations, the acoustic wave 32 is a shear wave. Incident light beam 14, 16 is polarized so as to propagate in ultrasonic medium 28 as an ordinary beam with allowable wavevectors $k_i$ lying on the ordinary circle 43. The acoustic shear wave 32 with acoustic wavevector $K_a$ interacts with incident ordinary beam 14, 16 to cause a rotation of the polarization state of the beam, resulting in a diffracted extraordinary beam 34, 36. The allowable wavevectors of the diffracted beam 34, 36 lie on the extraordinary ellipse 35. For maximum diffraction bandwidth, acoustic wavevector $K_a$ is nearly tangent to the extraordinary ellipse 35. For the case shown in FIG. 2*a* the diffracted extraordinary beam 34, 36 exits the Bragg cell normal to the acoustic wave propagation direction, with its polarization rotated 90° from that of incident beam 14, 16. The angular separation between beam 34, 36 and beam 40, 42 is defined as $\theta_d$.

Referring back to FIG. 1, the orientation in the combination of mirror 20 and Bragg cell 24 with respect to dashed line 44 is identical with the orientation of mirror 22 with Bragg cell 25 and dashed line 46. Deviation from a square geometry of the arrangement, as would be the case along lines 14, 16, 44, and 46, is accounted for by the Bragg cell diffraction angle $\theta_d$ (FIG. 2*a*), this angle being effected by driving each Bragg cell at its center frequency $w_0$ as discussed above. This preferred geometry provides an equal path length through both legs of the interferometer. Immediately after undiffracted beams 40 and 42 exit Bragg cells 24 and 25, respectively, they are blocked by first optical blocking means 48 and second optical blocking means 50, respectively. After this point, the system is unencumbered by what amounts to optical noise arising from beams 40 and 42 which do not contain useful signal information, thus enabling more effective manipulation of the information carrying beams 34 and 36.

As shown in FIG. 1, diffracted beams 34 and 36 are incident on first imaging lens 52 and second imaging lens 53, respectively. The optical axis of imaging lens 52 is coincident with the portion of diffracted beam 34 corresponding to input signals at $w_0$. Likewise, the optical axis of imaging lens 53 is coincident with the portion of diffracted beam 36 corresponding to input signals at $w_0$. Imaging lens 52 images, with magnification M, the diffracted beam 34 through cube beam combiner 54 and onto time-integrating linear optical detector array 27. Imaging lens 53 images, also with magnification M, the diffracted beam 36 via reflective plane 56 of beam combiner 54 onto time-integrating linear optical detector array 27. It is to be particularly noted that by virture of the extinction of the undiffracted beams 40 and 42 as described in the preceding paragraph, imaging lenses 52 and 53 may be totally devoted to the diffracted beams 34 and 36, respectively, enabling their full power, in terms of f-number, to be usefully employed. Magnification by imaging lenses 52 and 53 enable the correlation information incident on the linear optical detector array to be adequately sampled by the detector array pixels. Linear optical detector array 27 may be comprised, for example, of 1024 discrete detector pixels in a charge coupled device structure, where each pixel is 13 microns, resulting in a total detector dimension of 13.3 millimeters by 13 microns.

Figure 4:
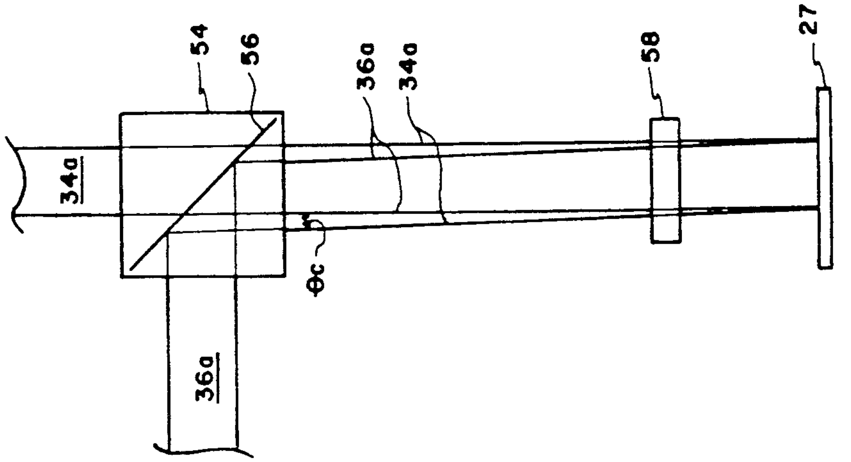
FIGS. 3 and 4 diagrammatically illustrate the action of a beam combiner to modify the optical paths as contemplated by this invention.
Figure 3:
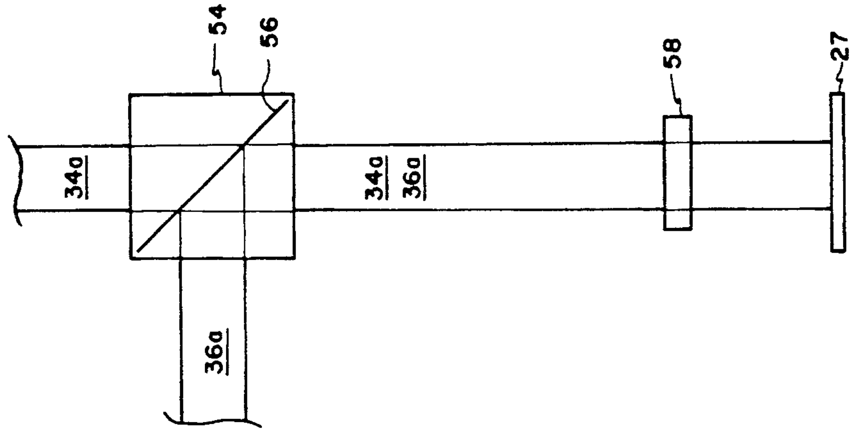

FIGS. 3 and 4 illustrate the method for combining the two diffracted beams in the cube beam combiner so as to place the correlation result on a spatial carrier of a selectable frequency. Referring to FIG. 3, diffracted beams 34*a* and 36*a* illuminate beam combiner cube 54 to collinearly recombine the beams, which are then passed through cylindrical condensing lens 58 and are incident on time-integrating linear optical detector array 27. It is observed in FIG. 4 that, by appropriately orienting the cube beam combiner 54, the angular separation $\theta_c$ can be controlled between the two components of the recombined beam arising from incident beams 34a and 36a. This is accomplished while maintaining the overlap of the beams at detector array 27. It is noted that a change in the carrier frequency of the two signals to be correlated will also result in a change in $\theta_c$, but this adjustment will lead to a decrease in the available system bandwidth due to the limited bandwidth of the acousto-optic devices. The angle $\theta_c$ is adjusted to provide the desired spatial carrier frequency, $w_c$, given by $$W_c = 2\pi \sin \theta_c/\lambda. \quad (1)$$

where $\lambda$ is the wavelength of the laser light. This spatial carrier allows for later removal of low-frequency bias terms through bandpass filtering and also provides a means for obtaining complex correlations. Cylindrical condensing lens 58 serves to compress the recombined beam in the dimension orthogonal to both the light propogation direction and the correlation information axis so as to match a like dimension on detector array 27.

Referring back to FIG. 1, the resulting integrated voltages appearing on linear optical detector array 27 may be described as $$V_{out}(x) = \int_T [L_1(t,x) + L_2(t,x)]^2 dt \quad (2)$$

where $L_1(t,x)$ and $L_2(t,x)$ are the two components of recombined and imaged beams 34a and 36a incident on detector array 27, where x is the spatial position on the detector array and T is the total integration time. In this equation, the sum of the two components is realized by the cube beam combiner 54. The squaring of this sum is realized by the square-law detection process characteristic of detector array 27, and the integration is accomplished in the time-integrating linear optical detector array and continues over the time duration of the complex signals $S_1(t)$ and $S_2(t)$ to be correlated. The cross-terms that result upon expanding the square combine to form the desired coherent correlation term modulated onto a spatial carrier, which may be described as $$V_{desired}(x) = Re\{\exp(jw_c x) \int_T S_1(t-x) S_2^*(t) dt\} \quad (3)$$

where $w_c$ is the spatial carrier frequency which is a function of the recombined beam angular offset $\theta_c$ described above, * denotes the complex conjugate operation, and x, the spatial position on the detector array, represents the relative time delay betwen the two signals being correlated. The relative delay coordinate, x, along the correlation information axis, is related to the true relative time-domain correlation delay $\tau$ by, $$x = M\tau v_a/2 \quad (4)$$

where, M is the imaging lens magnification as above, $v_a$ is the velocity of the acoustic signal in the Bragg cells, and the factor of 2 arises due to the fact that the two signals counterpropagate across each other on detector array 27 resulting in a time compression. The complex cross-correlation may be described as $$\int_T S_1(t-x) S_2^*(t) dt = R(x) \exp[j\phi(x)] \quad (5)$$

where R(x) is the amplitude of the complex correlation and $\phi(x)$ is the phase of the complex correlation. Using this relationship in Equation 3 the desired output from detector array 27 can be described as $$V_{desired}(x) = R(x) \cos [w_c x + \phi(x)]. \quad (6)$$

This desired voltage, and the additional low frequency bias terms, are then clocked out of the linear optical detector array 27, thereby converting the positional information along the coordinate x into temporal information given by, $$V_{desired}(t') = R(t') \cos [w'_c t' + \phi(t')]. \quad (7)$$

The temporal carrier frequency $w'_c$ is related to the spatial carrier frequency $w_c$ by, $$w'_c = w_c(\text{clock out rate})(\text{distance between pixel centers}). \quad (8)$$

and the time coordinate t' is related to the spatial coordinate x by, $$t' = x/[(\text{clock out rate})(\text{distance between pixel centers})]. \quad (9)$$

For example, if a 1 megahertz clock out rate is employed and the distance between pixel centers is 13 microns, a distance of 52 microns, or four pixels, on the detector array would convert to a time of 4 microseconds. Likewise, if the spatial carrier frequency, $w_c$, was $2\pi$ radians per 52 microns, then the temporal carrier frequency, $w_c'$, would be $2\pi$ radians per 4 microseconds, or a frequency of 250 kilohertz.

Figure 1B:
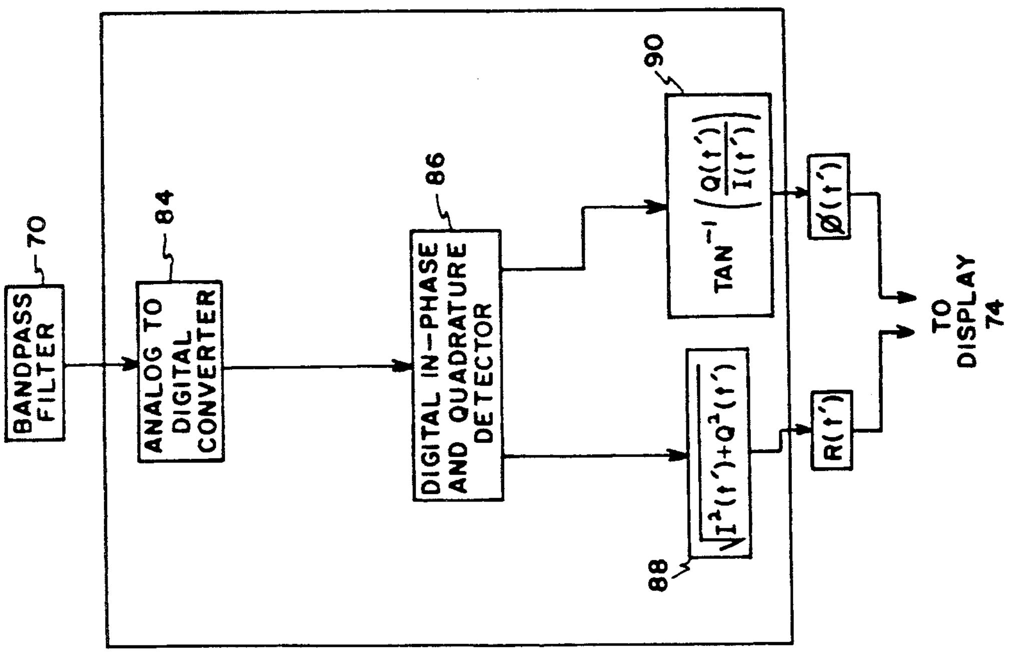
FIG. 1*b*** is a diagram illustrative of the in-phase and quadrature detection and magnitude and phase calculation.

Referring back to FIG. 1, voltage signal output 69 from detector array 27 and described in Equation 7 is input into electronic bandpass filter 70 which has a center frequency corresponding to $w'_c$. This filter suppresses the undesirable low-frequency bias terms that result during the summing and square-law detecting process, and passes the desired complex correlation result centered at frequency $w'_c$. Conventional in-phase and quadrature detection is then performed in magnitude and phase processor 72. FIG. 1b illustrates the step-by-step method of performing digital in-phase and quadrature detection and magnitude and phase calculation, which may be also be done in analog format. Analog to digital converter 84 converts the desired analog signal, given by Equation 7, into a digital signal. Significantly, the required sampling rate of this analog to digital converter is on the order of 0.001 of the bandwidth of the signals to be processed, $S_1(t)$ and $S_2(t)$. Digital in-phase and quadrature detector 86 then extracts the in-phase channel output, $$I(t') = R(t') \cos [\phi(t')] \quad (10)$$

and the quadrature channel output, $$Q(t') = R(t') \sin [\phi(t')]. \quad (11)$$

The magnitude calculator 88 then performs the operation, $$R(t') = [I^2(t') + Q^2(t')]^{\frac{1}{2}} \quad (12)$$

and the phase calculator 90 performs the operation, $$\phi(t') = \mathrm{Tan}^{-1}[Q(t')/I(t')]. \quad (13)$$

Figure 6:
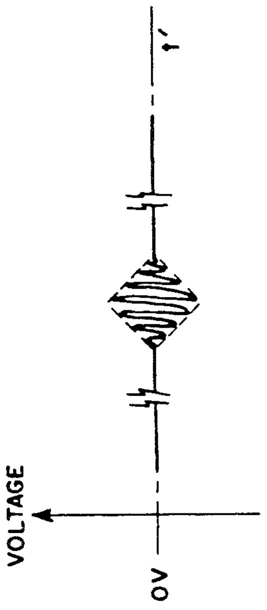
FIG. 6 illustrates the output signal voltage of FIG. 5 after undesired low-frequency signal content is removed.
Figure 8:
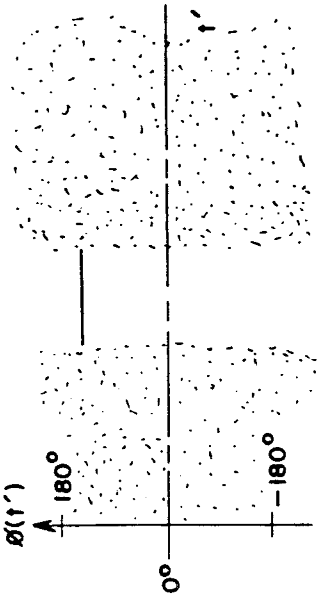
FIG. 8 is a waveform illustrative of the output correlation phase.
Figure 5:
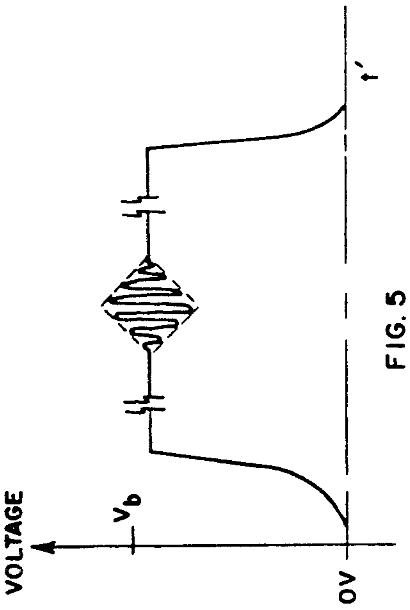
FIG. 5 illustrates the output signal voltage from the linear optical detector array.
Figure 7:
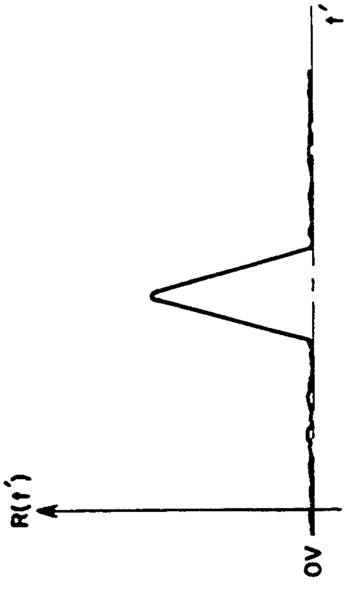
FIG. 7 is a waveform illustrative of the output correlation magnitude.

FIGS. 5, 6, 7, and 8 illustrate the results achieved for the signal processing algorithm described above. The signal employed in this example is a very wideband continuous noise signal with center frequency $w_o$ equal to the center frequency of the Bragg cells. An autocorrelation of this signal is performed and results in the linear optical detector array output 69 (FIG. 1) shown in FIG. 5. Note that this output is composed of a bias voltage level, $v_b$, and the desired autocorrelation function on a spatial carrier. FIG. 6 illustrates the signal format after passing through the electronic bandpass filter 70 (FIG. 1), where the low-frequency bias terms have been suppressed. FIGS. 7 and 8 illustrate the output correlation magnitude and correlation phase, respectively, appearing after the magnitude and phase processor. The resulting magnitude and phase of the correlation are then displayed on display 74 (FIG. 1).

Figure 1A:
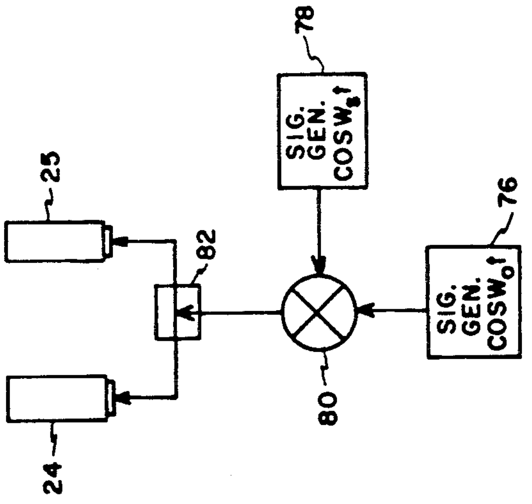
**FIG. 1*a* illustrates a circuit for effecting calibration of the signals produced by the correlator.
Figure 11:
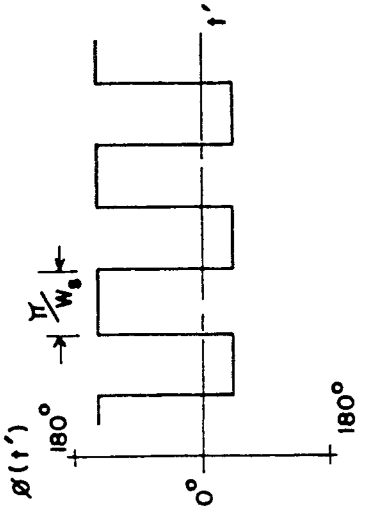
FIGS. 10 and 11 are graphical illustrations of the processor output magnitude and phase obtained with a two-tone calibration waveform whose spectrum is shown in FIG. 9.
Figure 9:
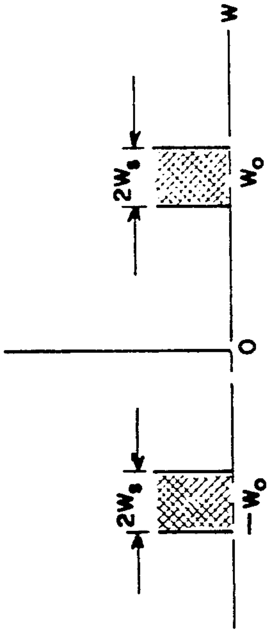
FIG. 9 illustrates the spectrum of a two-tone calibration signal provided by the circuit shown in FIG. 1*a*.
Figure 10:
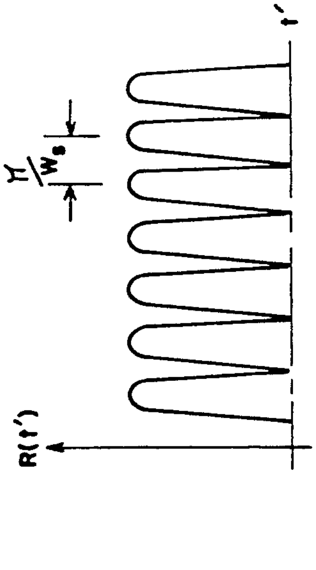

Because of the scaling that occurs first between the true correlation signal delay, $\tau$, and the detector array spatial dimension, x, given by Equation 4, and then between the spatial dimension, x, and the processor output coordinate, t', given by Equation 9, it is desirable to have a delay calibration system. Such is obtained via a calibration signal generated as shown in FIG. 1*a*. Thus, signal generator 76 generates a carrier signal $w_o$, and signal generator 78 creates a cosinusoidal signal of frequency $w_s$. The output of signal generator 78 at frequency $w_s$ is modulated onto the carrier signal at frequency $w_o$ from signal generator 76 by mixer 80. The resultant spectrum of this two-tone signal is shown in FIG. 9. This signal is then equally split in power splitter 82 and fed to the input terminals of Bragg cells 24 and 25. As a result there is effected an autocorrelation magnitude and phase at the processor output as shown in FIGS. 10 and 11, respectively. Because of the correlation properties of this two-tone signal, it is known that the separation, $\delta\tau$, between adjacent peaks of the autocorrelation function is described by, $$\delta\tau = \pi / w_s. \tag{14}$$

For example, for a calibration signal frequency, $w_s$, of $2\pi \times 10^8$ radians per second (frequency of 100 megahertz), the two-tone frequency separation (FIG. 9) will be $4\pi \times 10^8$ radians per second, and the resulting temporal separation between adjacent peaks of the autocorrelation output will be 5 nanoseconds. This information can then be used to scale the processor output, given in terms of the time dimension t' with high accuracy.

From the foregoing, a clearly improved system for obtaining the coherent correlation of very wideband signals of arbitrary modulation format has been provided. While attaining a clear advancement over the current state of the art, the system still employs commercially available componentry, including the Bragg cells and detector arrays, thus enabling the system to be realized economically. Also the small number and size of the componentry enables the system to be realized in compact form.

The system enables the attainment of correlation of signals with maximum bandwidths and time-bandwidth products. The present system also provides, as described, a correlation delay calibration technique to enable accurate scaling of processor output coordinates.

Finally, the system is especially well configured for very wideband radar pulse compression of all high time-bandwidth product radar waveforms. The invention provides a means for obtaining precise temporal resolution through the accommodation of very wide signal bandwidths, while maintaining the processed magnitude and phase. In addition, this compact, low-cost signal processor would also be useful in meeting the demanding requirements of signal intercept, seismic processing, computerized tomography, ultrasonic imaging, and nuclear magnetic resonance. Each of these applications currently require several racks of digital hardware. Breadboard implementations of the preferred embodiment have demonstrated results, for arbitrary modulation formats, which surpass those of any other known correlation processor.

We claim:

1. An acousto-optical correlation system comprising:

a coherent light source;

optical beam splitting means responsive to said coherent light source for providing first and second light beams along separate first and second paths;

a first acousto-optical modulation means positioned to receive said first light beam and responsive to a first electrical input signal for transferring the signal modulation of said first electrical input signal into a spatial and temporal optical modulation on a first diffracted light beam which exits from said first acousto-optical modulation means along a third path and which also transmits a first undiffracted light beam;

a first light means for intercepting said first undiffracted light beam from said first acousto-optical modulation means;

a first optical imaging means positioned to receive said first diffracted light beam and form an image in an image plane;

a second acousto-optical modulation means positioned to receive said second light beam and responsive to a second electrical input signal for transferring the signal modulation of said second electrical input signal into a spatial and temporal optical modulation on a second diffracted light beam which exits from said second acousto-optical modulation means along a fourth path and which also transmits a second undiffracted light beam;

a second light means for intercepting second undiffracted light beam from said second acousto-optical modulation means;

a second optical imaging means positioned to receive said second diffracted light beam and form an image in said image plane;

optical beam combining means for combining and redirecting said first and second diffracted light beams traveling along said third and fourth paths, respectively, along fifth and sixth paths toward said image plane and wherein said fifth and sixth paths are positioned at an angle relative to one another and wherein said first and second diffracted light beams are coincident at said image plane thereby producing optical interference fringes on said image plane; and photodetecting means disposed in said image plane for providing an output that is directly related to the complex correlation between said first and second electrical input signal as modulated by said optical interference fringes.

2. A system as set forth in claim 1 wherein said coherent light source is a laser.

3. A system as set forth in claim 1 wherein said optical beam splitting means and said optical beam combining means are cubical beamsplitters.

4. A system as set forth in claim 1 wherein said first and second acousto-optical modulation means are Bragg cells.

5. A system as set forth in claim 1 wherein said first and second optical imaging means are spherical optical lenses.

6. A system as set forth in claim 1 including focusing means disposed in said fifth and sixth paths for focusing said first and second diffracted light beams onto said image plane.

7. A system as set forth in claim 6 wherein said focusing means is a cylindrical optical lens.

8. A system as set forth in claim 1 wherein said photodetecting means is a linear array of photodetectors with individual outputs.

9. A system as set forth in claim 1 comprising electronic means responsive to said photodetecting means for demodulating output from said photodetecting means.

10. A system as set forth in claim 9 wherein said electronic means comprises in-phase and quadrature detector and magnitude and phase calculator.

11. A signal correlation processing system comprising:

a coherent radiation source;

beam splitting means responsive to said coherent radiation source for providing first and second beams along separate first and second paths;

first modulation means positioned to receive said first beam and responsive to a first electrical input signal for effecting modulation of said first beam in terms of a first electrical input signal and emitting a first diffracted beam modulated in terms of said first electrical input signal and which also emits a first undiffracted beam;

first blocking means spatially positioned to intercept said first undiffracted beam from said first modulation means;

first imaging means positioned to receive said first diffracted beam and form an image in an image surface;

second modulation means positioned to receive said second beam and responsive to a second electrical input signal for effecting modulation of said second beam in terms of a second electrical input signal and emitting a second diffracted beam modulated in terms of said second electrical input signal and which also emits a second undiffracted beam;

second blocking means spatially positioned to intercept said second undiffracted beam from said second modulation means;

second imaging means positioned to receive said second diffracted beam and form an image in an image surface;

beam combining means for combining and redirecting said first and second diffracted beams traveling along said third and fourth paths, respectively, along fifth and sixth paths toward said image surface and wherein said fifth and sixth paths are positioned at an angle relative to one another and wherein said first and second diffracted beams are coincident at said image surface thereby producing interference fringes in said image surface; and photodetecting means disposed in said image plane for providing an output that is directly related to the complex correlation between said first and second electrical input signal as modulated by said interference fringes.

12. A system as set forth in claim 11 including focusing means disposed in said seventh and eighth paths for focusing said first and second diffracted beams in the image plane.

13. A system as set forth in claim 11 wherein said detecting means is a linear array of photodetectors having individual outputs.

14. A system as set forth in claim 11 comprising electronic means responsive to said detecting means for providing demodulation of said output from said photodetection means.

15. A system as set forth in claim 14 wherein said electronic means comprises in-phase and quadrature detector and amplitude and phase calculator.

16. A system as set forth in claim 11 where at least one of said blocking means includes blocking means spatially positioned to receive a said undiffracted beam and not a said diffracted beam.

* * * * *